US012139890B1

(12) United States Patent
Leverich et al.

(10) Patent No.: US 12,139,890 B1
(45) Date of Patent: Nov. 12, 2024

(54) LIQUID FLOW DETECTION

(71) Applicant: United Services Automobile Association (USAA), San Antonio, TX (US)

(72) Inventors: Josiah J. Leverich, San Antonio, TX (US); Neal A. Lamoureux, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 974 days.

(21) Appl. No.: 16/738,626

(22) Filed: Jan. 9, 2020

Related U.S. Application Data

(63) Continuation of application No. 15/336,471, filed on Oct. 27, 2016, now Pat. No. 10,563,382, which is a continuation of application No. 13/689,315, filed on Nov. 29, 2012, now abandoned.

(51) Int. Cl.
*E03B 7/07* (2006.01)
*G01F 1/68* (2006.01)
*G01M 3/00* (2006.01)

(52) U.S. Cl.
CPC .............. *E03B 7/071* (2013.01); *E03B 7/072* (2013.01); *G01F 1/68* (2013.01); *G01M 3/002* (2013.01)

(58) Field of Classification Search
CPC ............ E03B 7/071; E03B 7/072; G01F 1/68; G01M 3/002
See application file for complete search history.

(56) References Cited

U.S. PATENT DOCUMENTS

| | | | |
|---|---|---|---|
| 4,308,746 A | 1/1982 | Covington | |
| 4,336,708 A | 6/1982 | Hobgood et al. | |
| 5,343,737 A | 9/1994 | Baumoel | |
| 5,415,033 A | 5/1995 | Maresca, Jr. et al. | |
| 5,453,944 A | 9/1995 | Baumoel | |
| 6,112,580 A | 9/2000 | Hesky | |
| 7,058,532 B1 | 6/2006 | Yamagishi et al. | |
| 7,076,373 B1 * | 7/2006 | Munsterhuis | G01M 3/002 |
| | | | 702/51 |
| 7,218,237 B2 | 5/2007 | Kates | |
| 7,308,824 B2 | 12/2007 | Trescott, Jr. et al. | |
| 7,561,057 B2 | 7/2009 | Kates | |
| 8,031,079 B2 | 10/2011 | Kates | |
| 8,174,398 B2 | 5/2012 | Wien | |

(Continued)

FOREIGN PATENT DOCUMENTS

| | | | |
|---|---|---|---|
| CN | 102182931 A | * | 9/2011 |
| WO | WO2013057506 A1 | * | 4/2013 |

OTHER PUBLICATIONS

Endress+Hauser (The Thermal Flow Measuring Principle, [retrieved on Aug. 27, 2015]. Retrieved from the https://www.youtube.com/watch?v=YfQSf2NBGqc, Upload on Jul. 14, 2009), 9 pages.
Jay MacDonald (10 Hidden Home Insurance Credits, [online], [retrieved on Sep. 1, 2015]. Retrieved from the http://www.foxbusiness.com/personal-finance/2011 /02/03/hidden-home-insurance-credits/, Published Feb. 3, 2011 ), 8 pages.

(Continued)

*Primary Examiner* — John C Kuan
(74) *Attorney, Agent, or Firm* — Fish & Richardson P.C.

(57) ABSTRACT

Liquid flow detection is described herein. One method for liquid flow detection includes heating a zone of liquid in a closed system, measuring changes in liquid temperature of the zone, and detecting a liquid flow pattern based on the measured changes in liquid temperature of the zone.

20 Claims, 4 Drawing Sheets

(56) References Cited

U.S. PATENT DOCUMENTS

| | | |
|---|---|---|
| 2002/0046773 A1 | 4/2002 | Bishop et al. |
| 2002/0120411 A1 | 8/2002 | Fierro et al. |
| 2004/0244478 A1 | 12/2004 | Kanke et al. |
| 2005/0189343 A1 | 9/2005 | Griffin et al. |
| 2007/0168150 A1 | 7/2007 | Hirata et al. |
| 2007/0174016 A1 | 7/2007 | Ding et al. |
| 2008/0016959 A1 | 1/2008 | Nakano et al. |
| 2008/0163700 A1 | 7/2008 | Huang |
| 2009/0303057 A1 | 12/2009 | Brown |
| 2010/0147068 A1 | 6/2010 | Neuhaus et al. |
| 2010/0212748 A1 | 8/2010 | Davidoff |
| 2010/0313958 A1 | 12/2010 | Patel et al. |
| 2011/0320140 A1 | 12/2011 | Butler et al. |
| 2015/0313478 A1* | 11/2015 | Veszelei ............... A61B 5/743 600/483 |
| 2016/0011028 A1* | 1/2016 | Skarping ............... G01F 25/10 73/204.11 |
| 2017/0013828 A1* | 1/2017 | Boucher ............... A01N 1/0247 |

OTHER PUBLICATIONS

Kluth, et al. "Digital pipeline leak detection"; What's New in Process Technology—Apr. 2008; published by Westwick-Farrow Publishing; accessed on Oct. 10, 2012; http://www.ProcessOnline.com.au; 3 pages.

Magnetrol, Thermatel, Thermal Dispersion Mass Flow, Measurement Handbook, 2012, 36 pages.

Nikles, et al. "Leakage detection using fiber optics distributed temperature monitoring"; Smartec SA; http://smartec.ch/Bibliography/PDF/C106.pdf; accessed Oct. 10, 2012; 7 pages.

* cited by examiner

LIQUID FLOW DETECTION

CROSS-REFERENCE TO RELATED APPLICATIONS

This application is a continuation application of and claims priority to U.S. application Ser. No. 15/336,471, filed on Oct. 27, 2016, which is a continuation application of and claims priority to U.S. application Ser. No. 13/689,315, filed on Nov. 29, 2012, now abandoned, the entire contents of each of which are incorporated herein by reference.

TECHNICAL FIELD

The present disclosure relates to methods, computer-readable medium, and systems for liquid flow detection.

BACKGROUND

A building and/or a complex can contain liquid that flows in a closed system. Liquid from the closed system may leak due to structural issues, blockage in the closed system, and/or external problems (e.g., environmental disaster, animal invasion, etc.), among other issues and/or problems in the closed system. Such leaks may cause damage to the building and/or complex, in addition to the expense of the leaked liquid. For instance, a water system in a dwelling may have a leak causing flooding in the dwelling.

DETAILED DESCRIPTION

Figure 1:
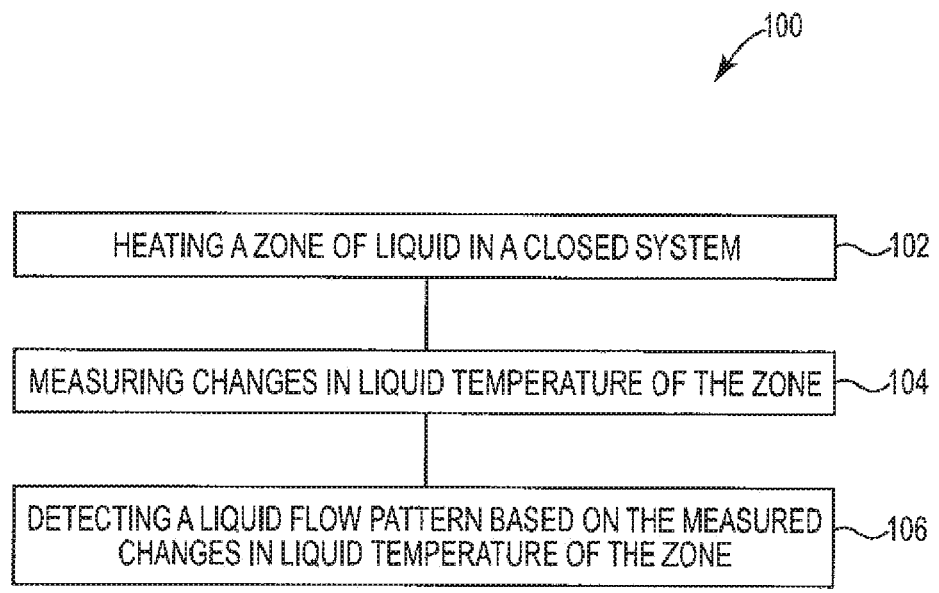
FIG. 1 illustrates a block diagram of an example of a method for liquid flow detection according to one or more embodiments of the present disclosure.

The present disclosure provides method, system, and computer-readable medium embodiments for liquid flow detection. A flow of liquid, in accordance with one or more embodiments, may be detected by measuring changes in temperature of a zone of liquid in a closed system over a period of time to learn patterns of flows and/or to identify anomaly patterns.

A closed system containing flowing liquid, such as a water system in a dwelling, may have disturbances in the closed system that result in a leak of liquid. A disturbance can include a variable and/or a parameter that adversely affects the output of liquid (e.g., as compared to the input of liquid) of the closed system. Example disturbances that may result in a leak of liquid can include a break in the closed system (e.g., hole and/or crack in a pipe and/or portion of the closed system), a blockage in the closed system that may result in slowing of liquid flow and/or may lead to a break in the closed system, and/or failure of a mechanism and/or sub-portion of the closed system (e.g., shut-off valve failure and/or appliance continuously running). Leaks caused by a disturbance can result in damage to the closed system and/or areas around the closed system (e.g., building), in addition to costing money from liquid lost due to the leak.

Leaks in a closed system can be detected and/or measured based on a flow of liquid in the closed system. For instance, a flow of liquid at a point upstream can be compared to a flow of liquid at a point downstream in the closed system. Further, a flow of liquid can be measured by comparing temperature measurements of the liquid in different points of the closed system. Alternatively and/or in addition, pressure changes of the liquid in the closed system (e.g., pressure is affected by a flow in closed system) can be measured to identify a leak. However, such example approaches may be unable to distinguish common liquid usage in the closed system from a leak of liquid, can be expensive to establish, and/or may not be able to identify leaks of low magnitude.

In contrast, liquid flow detection in accordance with one or more embodiments of the present disclosure may include identifying liquid flow patterns in a closed system to detect common liquid usage patterns and identify anomaly flow patterns (e.g., leaks). For instance, liquid flow detection can include heating a zone of liquid in a closed system, measuring changes in liquid temperature of the zone, and detecting a liquid flow pattern based on the measured changes in liquid temperature of the zone. The liquid flow pattern can be used to detect anomalies in the closed system that may be smaller in magnitude than the alternative approaches are able to detect, in a shorter period of time, and/or with minimal cost to detect.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 214 may reference element "14" in FIG. 2A, and a similar element may be reference as 314 in FIG. 3.

As used herein, "a" or "a number of" something can refer to one or more such things. For example, "a number of objects" can refer to one or more objects. Additionally, the designator "N", as used herein, particularly with respect to reference numerals in the drawings, indicate that a number of the particular feature so designated can be included with a number of embodiments of the present disclosure.

FIG. 1 illustrates a block diagram of an example of a method for liquid flow detection according to one or more embodiments of the present disclosure. The method 100 can, for instance, be used to detect liquid flow patterns in a closed system. Liquid can include water, oil, chemicals and/or gases in liquid form (e.g., ethanol, bleach, and/or liquid nitrogen), liquid mixtures (e.g., gasoline), and/or paint, among other types of liquids.

A closed system, as used herein, can include a system and/or environment that may be designed to not exchange liquid and/or any matter with its surroundings, and may be designed to not be subject to an external force. Inputs (e.g., variables) and outputs (e.g., controlled action) may be known and/or can be known within a particular period of time with a closed system. For example, a closed system can include a water system of a dwelling that contains pipes to transport water throughout the dwelling. Thereby, absence a disturbance in the closed system, the flow of liquid into the system may be equal to the flow of liquid out of the closed system.

A disturbance can include a variable that adversely affects the value of the output of liquid from the closed system. Disturbances can be internally generated by the closed system and/or can include an input that is generated outside the closed system (e.g., external force that negatively affects the closed system). For instance, an internally generated disturbance can include a failure and/or malfunction of a sub-portion of the closed system. Such a failure and/or a malfunction can include a breakdown of material resulting in a hole and/or a crack in a sub-portion of the closed system (e.g., in a pipe), and/or failure of a shut-off valve resulting in continuous flow of liquid into the system. An input generated outside the closed system can include a failure and/or a malfunction of an appliance of the environment the closed system is located in (e.g., a toilet, a water softener, and/or a water feature on a refrigerator).

In some instances, a disturbance can cause a leak in the closed system. As illustrated in the embodiment of FIG. 1, a leak of liquid in the closed system can be detected by heating up a zone of liquid in the closed system and measuring changes to the temperature over a period of time to detect liquid flow patterns.

At block 102, the method 100 for liquid flow detection can include heating a zone of liquid in a closed system. The zone can be heated to a threshold temperature. A threshold temperature can, for example, include a temperature value and/or a range of temperature values that includes a stabilized temperature. Heating a zone of liquid to a threshold temperature can include heating the zone of liquid to a measured temperature at and/or within the threshold temperature. The zone can be heated using a heating component. A heating component can include a physical source of heat. For example, a heating component can include liquid heater (e.g., a water heater).

At block 104, the method 100 for liquid flow detection can include measuring changes in liquid temperature of the zone. The measured changes can, for instance, be monitored over a period of time using a temperature sensor (e.g., a thermometer) and/or a controller to record and/or store the measured temperatures. A period of time can include seconds, minutes, hours, days, a week, and/or a month, among other amounts of time.

In accordance with some embodiments of the present disclosure, the zone of liquid in the closed system heated to a stabilized temperature can include a stabilized zone. For instance, a stabilized zone can include a zone of liquid in the closed system that is continuously and/or periodically measured and heated to a threshold temperature. As an example, in response to a measured change in liquid temperature of the zone being outside the threshold temperature, the zone of liquid can be re-heated to the threshold temperature. The amount of time it takes to heat and/or re-heat the zone of liquid to the threshold temperature can be stored and/or recorded, for instance.

At block 106, the method 100 for liquid flow detection can include detecting a liquid flow pattern based on the measured changes in liquid temperature of the zone. For instance, a pattern can include a change in temperature of the zone, an amount of time to re-establish the threshold temperature of the zone, the time of day, the day, and/or other considerations and/or variables.

A liquid flow pattern can be detected, for example, by monitoring the measured changes in liquid temperature over a period of time and identifying and/or calculating patterns based on the measured changes. As an example, a pattern can include a single liquid use including a zone of liquid at and/or within the threshold temperature, the zone of liquid outside the threshold temperature, and the amount of time to re-establish the zone of liquid to the threshold temperature (e.g., recovery pattern).

The one or more patterns detected can include liquid usage patterns of the closed system. For instance, the liquid usage patterns can include patterns representing common observed and/or acceptable usage of liquid in the closed system (e.g., an amount of time taken for a recovery pattern). The liquid usage patterns can be used to identify anomaly liquid flow patterns (e.g., leaks) and/or to identify overuse of liquid (e.g., identify that a dwelling overuses water).

In some embodiments of the present disclosure, the method 100 can include measuring liquid usage patterns using a learn mode. A learn mode can include a self-programmable process to detect liquid flow patterns for each of a number of subcomponents associated with the closed system (e.g., subcomponents of the environment the closed system is associated with) to learn a liquid usage pattern for each subcomponent. As an example, subcomponents can include appliances attached to the closed system, devices using liquid from the closed system, and/or other machines that may use output liquid from the closed system.

The learn mode can, for example, include the controller sending an instruction (e.g., a notification) and/or displaying an instruction to a user to run and/or turn on each subcomponent associated with the closed system in an orderly manner. Once a subcomponent has run, is running, and/or is turned on, the liquid usage pattern of the subcomponent can be detected and/or identified by measuring the recovery pattern of the subcomponent. For instance, the controller can instruct a user to flush a toilet in a house. In response to the user flushing the toilet, a recovery pattern associated with the toilet can be detected and/or measured. Thereby, a learn mode can be used to detect and/or identify common liquid usage patterns of the environment of the closed at the onset and/or beginning of establishing the system (e.g., a system to detect liquid flow). Using a learn mode, an anomaly liquid flow pattern can be identified immediately after the learn mode process has been completed.

An anomaly liquid flow pattern can include a liquid flow pattern that is greater than and/or outside a liquid usage pattern identified and/or detected. For instance, an anomaly liquid flow pattern, as used herein, can include a liquid flow above a threshold flow. A liquid flow above a threshold flow can include a flow pattern that cannot re-establish the stabilized zone of liquid (e.g., no recovery pattern), a recovery pattern greater than and/or outside a threshold time, and/or a flow pattern that includes a repetition of heating, temperature change, and reheating to regain and/or reach the threshold temperature (e.g., continuously in a recovery pattern).

In various embodiments of the present disclosure, liquid flow in the closed system can be automatically and/or remotely stopped in response to detecting an anomaly and/or a leak using a shut-off valve. For instance, liquid flow can be automatically stopped using the controller in communication with a shut-off valve. Alternatively and/or in addition, a notification can be sent to a user and the user can remotely stop liquid flow by communicating with the system (e.g., the controller) to shut-off the flow of liquid with a shut-off valve.

Figure 2A:
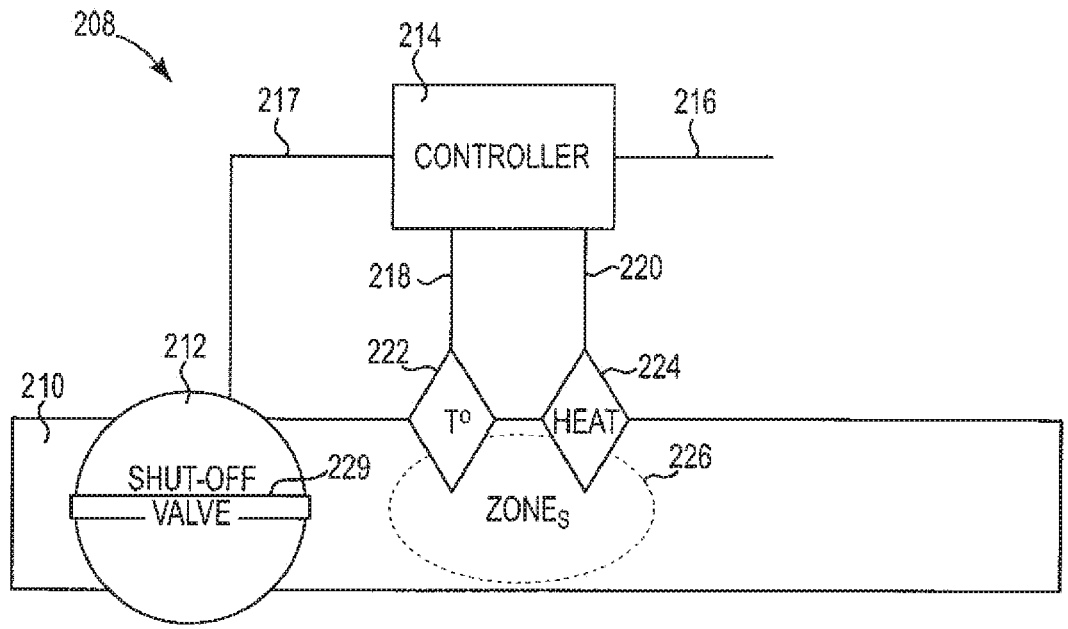
FIGS. 2A-2B illustrate block diagrams of an example of a system for liquid flow detection according to one or more embodiments of the present disclosure.
Figure 2B:
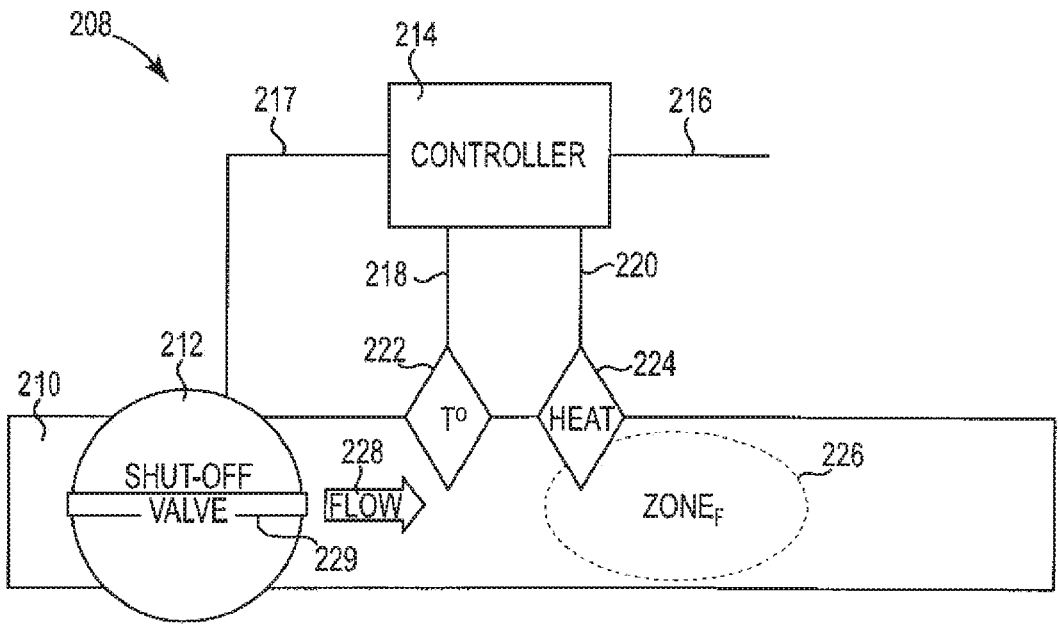

FIGS. 2A-2B illustrate block diagrams of an example of a system for liquid flow detection according to one or more embodiments of the present disclosure. The system 208 can be used to create a stabilized zone of liquid to detect patterns of liquid flow.

The system 208, as illustrated in FIG. 2A-2B can include a closed system 210 (e.g., a subcomponent of the closed system and/or a pipe as illustrated by 210 of FIG. 2A-2B), a shut-off valve 212, a temperature sensor 222, a heating component 224, and a controller 214. The temperature sensor 222 and/or the heating component 224 can be located inside the closed system 210. The temperature sensor 222 can be upstream from the heating component 224 in the closed system 210 (e.g., as illustrated by the flow 228 of FIG. 2B).

As illustrated in the embodiment of FIG. 2A, the system 208 can create a zone of liquid that is heated to a stabilized temperature (e.g., $zone_S$ 226). The heating component 224 can heat the $zone_S$ 226 to a stabilized temperature. A stabilized temperature can, for instance, include a threshold temperature (e.g., within and/or at the threshold temperature).

As illustrated in the embodiment of FIG. 2B, a temperature sensor 222 can measure changes in liquid temperature of the zone over a period of time. For instance, as liquid flows 228 in the closed system 210, the zone of liquid (e.g., $zone_F$ 226) can move away from the temperature sensor 222 resulting in a measurable change in temperature (e.g., as measured by the temperature sensor 222).

Although the embodiment of FIG. 2B illustrates the $zone_F$ 226 of liquid moving away from the temperature sensor 222 but still existing, embodiments of the present disclosure are not so limited. For example, the flow 228 of liquid in the closed system 210 can cause the zone of liquid to temporarily disappear. The heating component 224 may not be able to re-establish a zone of liquid at a stabilized temperature (e.g., $zone_S$ 226 as illustrated in FIG. 2A) until the flow 228 of liquid stops and/or slows.

A controller 214 can be connected 218, 220 to the temperature sensor 222 and the heating component 224. For instance, the connection 218 from the controller 214 to the temperature sensor 222 can include a wireless and/or a wired connection (e.g., electrical). The connection 220 from the controller 214 to the heating component 224 can include a wired connection capable of providing a particular voltage to the heating component 224. The controller 214 can include an integrated chip (e.g., electronic and/or computing device containing a processor, memory, and/or programmable input/output peripherals) and/or a circuit board. The controller 214 can be electronically connected 216 to a power source, for example.

The controller 214 can communicate with the temperature sensor 222 and/or the heating component 224. For instance, the controller 214 can instruct the heating component 224 to heat and/or re-heat the zone in response to the liquid temperature of the zone being outside a threshold temperature. In response to the liquid temperature of the zone reaching the stabilized temperature (e.g., within and/or at the threshold temperature), the controller 214 can instruct the heating component 224 to turn off and/or stop heating the zone. Further, the controller 214 can detect a liquid flow pattern based on the measured changes in liquid temperature of the zone over a period of time. The patterns can include liquid usage patterns and/or recovery patterns, for example.

In some embodiments of the present disclosure, the controller 214 can include a wireless communication subcomponent. A wireless communication subcomponent can include a subcomponent and/or sub-device that can receive and send signals and/or instructions wirelessly using a wireless network (e.g., Internet, wireless local area network, satellite, cellular networks, radio frequencies, and/or other wireless networks). A wireless communication subcomponent can, in some examples, include a radio (e.g., transmitter, receiver, and/or an antenna) designed to communicate using a wireless network.

As illustrated in the embodiment of FIGS. 2A-2B, the system 208 can include a shut-off valve 212. The shut-off valve 212 can be used to stop flow (e.g., flow 228 of FIG. 2B) of the liquid in response to the controller 214 identifying the flow 228 of liquid is greater than a threshold flow (e.g., flow pattern greater than and/or outside a threshold time, no recovery pattern, and/or continuously in a recovery pattern). The controller 214 can communicate with the shut-off valve 212 wirelessly and/or through an electronic connection (e.g., as illustrated by a wired connection 217 in the embodiments of FIGS. 2A-2B). The threshold flow can include an anomaly liquid flow pattern, for instance.

As an example, the shut-off valve 212 can include an electronic servo that can open and/or close the shut-off valve 212. An electronic servo can include an automatic sub-device (e.g., a motor) that uses error-sensing negative feedback to control the position of the shut-off valve 212. For instance, based on an identified anomaly liquid flow pattern and/or a flow above a threshold (e.g., threshold time), the electronic servo can close the shut-off valve 212 to stop flow of liquid in the closed system. Thereby, the electronic servo can open and/or close the shut-off valve 212 based on the identified flow patterns.

In accordance with various embodiments of the present disclosure, a threshold flow can include a user configurable setting. Thereby, an anomaly liquid flow pattern can be user configurable. A user can enter and/or establish settings using a network to communicate with the controller 214. For instance, a user can wirelessly communicate with the controller 214 using the Internet (e.g., with a mobile cellular telephone and/or the Internet) and/or a wireless communication subcomponent of the controller 214. User settings entered and/or established can include one or more threshold flows (e.g., multiple thresholds, different thresholds for different days, and/or times of the day) and/or no flow (e.g., a user is out of town and no flow should occur), among other flows. A threshold flow established by a user, as used herein, can include a flow pattern that is greater than and/or outside a threshold time (e.g., a predetermined time).

The user configurable settings can include a multi-level threshold. For instance, a flow greater than a first threshold can result in an alert sent to the user, a flow greater than a second threshold can result in a text sent to a mobile cellular telephone of the user, and a flow greater than a third threshold can result in the shut-off valve 212 stopping flow of liquid into the closed system 210. However, embodiments of the present disclosure are not so limited. A multi-level threshold can include more or less than three thresholds and/or additional notification settings.

In some embodiments of the present disclosure, a notification can be sent to the user based on the detected pattern of liquid flow being greater than and/or outside the user configured threshold flow and/or an identified anomaly flow. A notification can include an email, a sound and/or light notification on the controller 214, and/or a text sent to the user's mobile cellular telephone, among other notifications. In various embodiments, a user can set and/or establish the one or more notifications for the one or more thresholds.

In various embodiments of the present disclosure, the system 208 can include a manual bypass component 229. For instance, the system 208 may have an electrical malfunction (e.g. loss of power and/or function) and/or error, among many reasons that may cause flow of liquid into the closed system 210 to turn off and/or stop at an unintended time. As an example, an electrical failure can cause the controller 214 to turn off flow of liquid when no leak is present. Alternatively, a leak may be present that the user is aware but the user may be unable to solve the problem immediately and due to a functional error, the user may be unable to re-start flow of liquid into the closed system. The user may manually re-establish flow of liquid into the closed system 210 using the manual bypass component 229.

The manual bypass component 229, as illustrated in the embodiment of FIGS. 2A and 2B, can include a handle on the shut-off valve 212 that a user can turn to manually re-establish flow into the closed system 212. The handle can turn the shut-off valve 212 into an open and/or closed position, for instance. As an example, a user can utilize the manual bypass component 229 to open and/or close the shut-off valve 212 manually in an event of loss of power and/or function.

In some embodiments, the manual bypass component can include a subcomponent that connects the closed system 210 and/or allows liquid to flow in the closed system 210 when the shut-off valve 212 is activated by the system 208. The subcomponent can include a pipe and/or material that can bypass the shut-off valve 212 to allow liquid to flow. Alternatively, the manual bypass component can include a subcomponent (e.g., a pipe) that can be used in addition with a handle (e.g., as illustrated by 229 in FIGS. 2A and 2B) on the shut-off valve 212. For example, the handle on the shut-off valve 212 can activate and/or allow flow of liquid into the subcomponent (e.g., pipe) that bypasses the shut-off valve 212 and/or other components of the system 208.

Figure 3:
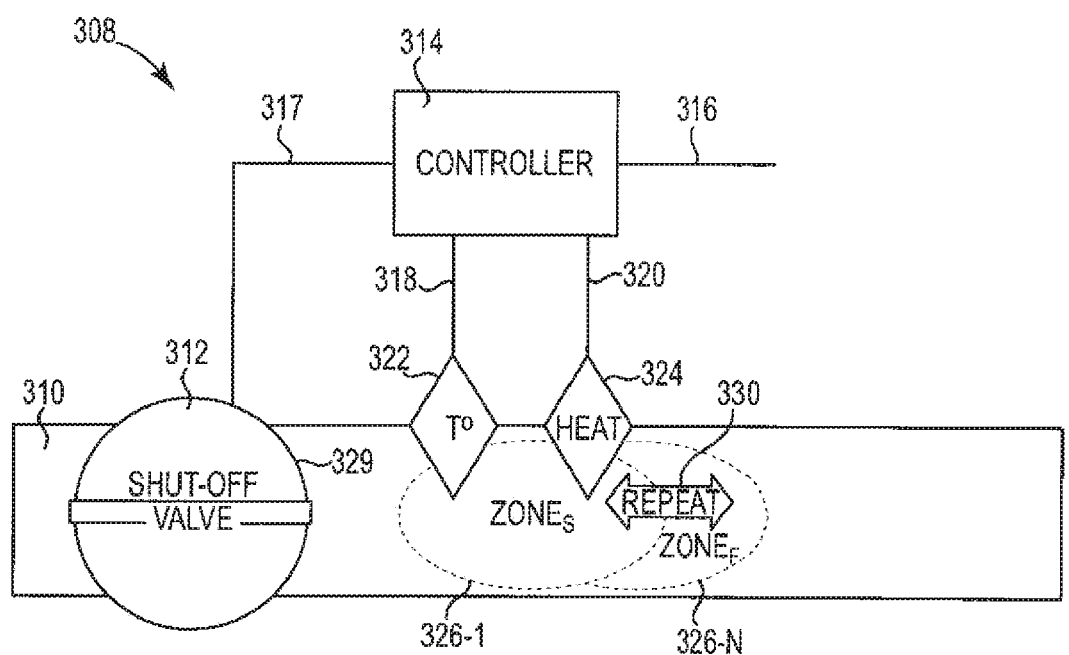
FIG. 3 illustrates a block diagram of an example of a system for liquid flow detection according to one or more embodiments of the present disclosure.

FIG. 3 illustrates a block diagram of an example of a system for liquid flow detection according to one or more embodiments of the present disclosure. The system 308, as illustrated in the embodiment of FIG. 3, can monitor recovery patterns in a closed system 310 over a period of time (e.g., as illustrated by the repeated 330 movement of a stabilized zone$_S$ 326-1 and a zone$_F$ 326-N during flow of liquid in the closed system 310).

The system 308 as illustrated in the embodiment of FIG. 3 can include the system 208 as illustrated in the embodiments of FIGS. 2A-2B. For instance, the system 308 can include a closed system 310 (e.g., a subcomponent of the closed system and/or a pipe), a shut-off valve 312, a temperature sensor 322, a heating component 324, a controller 314, a power source connected 316 to the controller 314, and/or a manual bypass component 329. The shut-off valve 312, the temperature sensor 322, and/or the heating component 324 can be electronically connected 317, 318, 320 to the controller 314. Alternatively and/or in addition, the temperature sensor 322 and/or the shut-off valve 312 can be connected to the controller 314 through a wireless connection and/or communication.

The system 308 can monitor recovery patterns in the closed system 310 over a period of time. For instance, one or more recovery patterns can include a repetition 330 of a zone of liquid in the closed system 310 heated to a threshold temperature (e.g., as illustrated by a stabilized zone$_S$ 326-1), the zone of liquid moving (e.g., as illustrated by the zone$_F$ 326-N during a flow of liquid), and the zone of liquid being re-heated to the threshold temperature (e.g., zone$_S$ 326-1).

In accordance with some embodiments of the present disclosure, the system 308 can be monitored over a period of time to identify liquid usage patterns. For instance, liquid usage patterns can include common monitored and/or observed recovery patterns, and/or acceptable liquid flow patterns. The liquid usage patterns can be used to identify one or more anomaly liquid flow patterns in the closed system 310. Alternatively and/or in addition, the system 308 can identify liquid usage patterns using a learn mode process (e.g., as described further in the embodiment of FIG. 1).

An anomaly liquid flow pattern can include a pattern that differs from the liquid usage patterns monitored and/or observed, and/or user configured patterns. For instance, an anomaly pattern can include a flow of liquid greater than a threshold flow (e.g., a flow pattern greater than a threshold time, no recovery pattern, and/or continuously in a recovery pattern). An anomaly pattern can be identified, for instance, by monitoring the system 308 for recovery patterns and/or using a learn mode. Anomaly patterns can be caused, for example, by a leak of liquid in the closed system 310.

In response to identifying and/or detecting an anomaly pattern and/or a leak of liquid in the system 308, the controller 314 can instruct the shut-off valve 312 to stop flow of the liquid into and/or in the closed system 310. For instance, liquid flow can be stopped in response to detecting a liquid flow pattern that is greater than a threshold time (e.g., recovery pattern greater than a threshold period of time and/or no recovery pattern) and/or a repeated recovery pattern.

In various embodiments, the liquid usage patterns can be used to monitor and identify liquid consumption. For instance, the system 308 can include a pipe in a building and/or a dwelling with water flowing through and/or in the pipe. The liquid usage patterns can represent and/or identify consumption of water in the building and/or the dwelling. Based on the identified liquid usage patterns, a conservation plan can be identified and/or formed to reduce consumption of water.

A conservation plan can include a plan to reduce liquid output from the closed system 310. For instance, a user can adjust liquid usage patterns (e.g., lower acceptable recovery pattern time from the observed and/or identified liquid usage patterns), adjust flow thresholds (e.g., lower a threshold time for a detected liquid flow pattern to be an anomaly), and/or adjust notification settings. Adjusting liquid usage patterns and/or flow thresholds can, for instance, result in a notification sent to the user and/or shut-off of liquid flow using the system 308 to occur prior to and/or with detected liquid flows with a lower threshold time than may occur with the identified liquid usage patterns and/or notifications established prior to the conservation plan.

Figure 4:
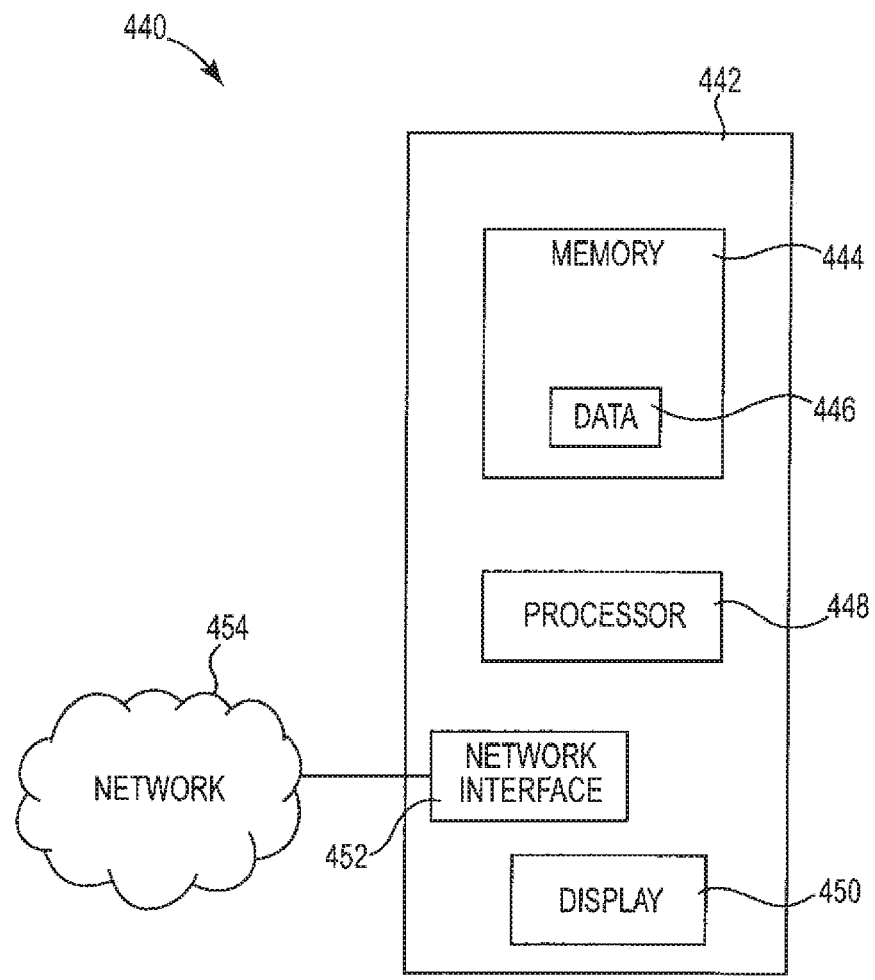
FIG. 4 illustrates a block diagram of an example of a computing system according to one or more embodiments of the present disclosure.

FIG. 4 illustrates a block diagram of an example of a computing system according to one or more embodiments of the present disclosure. The computing system 440 can be utilized with one or more embodiments of the present disclosure. For example, the computing system 440 can be utilized to perform the embodiments of FIGS. 1-3. The computing system 440 can include a computing device 442.

The computing device 442 can be, for example, a laptop computer and/or a desktop computer, among other types of computing devices. In some embodiments of the present disclosure, the computing device 442 can include the controller 214 as illustrated in FIGS. 2A and 2B and/or the controller 314 as illustrated in FIG. 3.

The computing device 442 can include a memory 444 and a processor 448 coupled to memory 444. For example, the memory 444 can include various types of information including data 446 and executable instructions, as discussed herein. Memory 444 can be any type of storage medium that can be accessed by processor 448 to perform various examples of the present disclosure (e.g., heat a zone of liquid in a closed system to a threshold temperature using a heating component, monitor changes in measured liquid temperature of the zone over a period of time using a temperature sensor, etc.) For example, memory 444 can be a non-transitory computer-readable medium having computer-readable instructions (e.g., computing device program instructions, machine readable instructions, computing device readable instructions, etc.) and data 446 stored thereon. The computer-readable instructions are executable by processor 448 to perform various examples of the present disclosure. The data 446 can be used (e.g., analyzed by) the computer-readable instructions during their execution.

Memory 444 can be volatile or nonvolatile memory. Memory 444 can also be removable (e.g., portable) memory, or non-removable (e.g., internal) memory. For example, memory 444 can be random access memory (RAM) (e.g., dynamic random access memory (DRAM) and/or phase change random access memory (PCRAM), read-only memory (ROM) (e.g., electrically erasable programmable read-only memory (EEPROM) and/or compact-disc read-only memory (CD-ROM), flash memory, a laser disc, a digital versatile disc (DVD) or other optical disk storage, and/or a magnetic medium such as magnetic cassettes, tapes, or disks, among other types of memory.

Further, although memory 444 is illustrated as being located in computing device 442, embodiments of the present disclosure are not so limited. For example, memory 444 can, in addition to or alternatively, be located internal to another computing resource (e.g., enabling computer readable instructions to be downloaded over the Internet or another wired or wireless connection).

The computing device 442 can include a network interface 452. Network interface 452 can connect the computing device 442 to a network, such as network 454 illustrated in FIG. 4.

Network 454 can be a wired or wireless network, such as, for instance, a wide area network (WAN) such as the Internet, a local area network (LAN), a personal area network (PAN), a campus area network (CAN), or metropolitan area network (MAN), among other types of networks. As used herein, a "network" (e.g., network 454) can provide a communication system that directly or indirectly links two or more computers and/or peripheral devices and allows users to access resources on other computing resources (e.g., computing devices and/or data storage devices) and/or exchange messages with other users.

A network can allow users to share resources on their own systems with other network users and to access information on centrally located systems or on systems that are located at remote locations. For example, network 454 can tie a number of computing devices together to form a distributed control network (e.g., permit a computing device to connect to a repository of multimedia files hosted and/or uploaded to a central server by other computing devices accessing the network).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network. For instance, the network 454 can be used to connect and/or communicate between devices and/or applications of a system, such as illustrated in the embodiment of FIG. 2A (e.g., system 208).

The computing device 442 can also include a display 450. Display 450 can include, for example, a screen that can provide (e.g., display and/or present) information to a user of computing device 442. For instance, the display 450 can provide a notification to the user.

Additionally, computing device 442 can receive information from the user of computing device 442 through an interaction with the user via display 450. For example, computing device 442 can receive input from the user via display 450 (e.g., a touch screen display or via another user input device such as a keyboard and/or touchpad in response to interaction with items shown on the display). For example, the user can enter the input into computing device 442 using, for instance, a mouse, keyboard, and/or touchpad associated with computing device 442 (e.g., display 450).

Alternatively and/or in addition, a user can enter the input into the computing device 442 using a user device (e.g., a mobile cellular telephone and/or a computing device) and the network 454. For instance, the network 454 can include the Internet and/or a wireless communication system. The computing device 442 can communicate with the network 454 and/or the user using a wireless communication.

In one or more embodiments, the processor 448, in association with memory 444, can be associated with data 446 and/or application modules (e.g., not shown in FIG. 4). The processor 448, in association with the memory 444, can store and/or utilize data and/or execute instructions to provide a number of application modules for liquid flow detection.

As used herein, a module can be a stand alone program or portion of a program or can be a set of code that provides a particular functionality and may not be stand alone and may not even include instructions interspersed within a set of code. Such application modules can include a heat module, a monitor module, and/or a detect module.

A heat module can, for example, be configured to heat a zone of liquid in a closed system to a threshold temperature using a heating component. A zone heated to a threshold temperature can include a stabilized zone and/or a zone with a stabilized temperature. The threshold temperature can include a numerical value and/or a numerical range of values. For instance, heating the zone of liquid to the threshold temperature can include heating the zone of liquid to within the numerical range of values of the threshold temperature.

A monitor module can be configured to monitor changes in measured liquid temperature of the zone over a period of time using a temperature sensor. In some embodiments, in response to a measured liquid temperature of the zone being outside the threshold temperature, the monitor module can instruct the heat module to re-heat the zone of liquid to the threshold temperature.

A detect module can, for instance, be configured to detect a liquid flow pattern based on the monitored changes in measured liquid temperature of the zone. The changes in liquid temperature can be monitored over the period of time by measuring the liquid temperature of the zone continuously and/or periodically (e.g., once every ten seconds).

In some embodiments of the present disclosure, a user can remotely shut-off the flow of liquid into the closed system. For instance, a user can wirelessly communicate with the computing device 442 to input an instruction to remotely shut-off flow using a controller (e.g., the computing device 442) and/or a shut-off valve. In response to an input from a user device (e.g., an input instruction), liquid flow in the closed system can be shut-off.

In accordance with various embodiments, the system 440 can be connected to a third party system, a wireless communication system (e.g., a network), and/or a water softener. For instance, the system 440 can monitor the closed system through and/or connected to the water softener. The system 440 can, for example, connect to a wireless communication system using a wireless communication subcomponent of the computing device 442.

A third party system can include a security system, an insurance company system, and/or a government system, among other third parties. For example, the system 440 connected to a security system can be used to notify a security company associated with the security system of a leak in the closed system and/or the security company can send assistance.

In another example, the system 440 can be connected to an insurance company system. Connecting the system 440 to the insurance company system can include a communication from the system 440 to the insurance company system identifying that the system 440 is in place and/or that the user is monitoring the closed system, using the system 440, to detect leaks. Alternatively and/or in addition, the insurance company can connect to the system 440 to monitor the closed system for leaks. The insurance company can, for example, offer an insurance rate discount to a user that monitors liquid flow of a dwelling and/or allows the insurance company to monitor liquid flow of the dwelling.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure and should not be taken in a limiting sense. As used herein, "a" or "a number of" used in referring to a particular thing is intended refer to one or more such things.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, if provided, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, inventive subject matter lies in less than all features of a single disclosed embodiment. Thus, the claims, if provided, are hereby incorporated into the Detailed Description, with each claim standing on its own as a separate embodiment.

What is claimed:

1. A system for liquid flow anomaly detection, the system comprising:
    a heating element;
    a temperature sensor;
    at least one processor; and
    a memory communicatively coupled to the at least one processor, the memory storing instructions which, when executed, cause the at least one processor to perform operations comprising:
        heating, using the heating element, liquid in a zone of a liquid distribution system to a threshold temperature, the heating element being located within the liquid distribution system at a first location;
        measuring, using the temperature sensor, one or more changes in temperature of the liquid in the zone, the one or more changes bringing the temperature of the liquid in the zone to one or more temperatures that are outside the threshold temperature, the temperature sensor being located within the liquid distribution system at a second location that is upstream from the first location;
        detecting a liquid flow pattern based on the measured one or more changes in the temperature, the liquid flow pattern indicating an amount of time to re-establish the zone of liquid to the threshold temperature; and
        in response to detecting the liquid flow pattern, performing at least one of (i) stopping a liquid flow in the liquid distribution system, or (ii) sending a notification of the detected liquid flow pattern to a user.

2. The system of claim 1, the operations further comprising, in response to determining that the detected liquid flow pattern indicates a liquid flow anomaly, using a shut-off valve to stop the liquid flow in the liquid distribution system.

3. The system of claim 2, wherein the liquid flow anomaly comprises a leak of at least some of the liquid from the liquid distribution system.

4. The system of claim 1, wherein the liquid flow pattern is a recovery pattern exhibited by the one or more changes in the temperature.

5. The system of claim 4, wherein the recovery pattern is associated with at least one subcomponent of the liquid distribution system.

6. The system of claim 1, wherein heating liquid in a zone of a liquid distribution system to the threshold temperature comprises:
    heating the liquid in the zone to the threshold temperature during a first time period; and
    heating the liquid in the zone to the threshold temperature during a second time period that is after the first time period.

7. The system of claim 6, wherein the amount of time to re-establish the zone of liquid to the threshold temperature is an amount of time for the liquid in the zone to reach the threshold temperature during at least one of the first time period and the second time period.

8. A method, comprising,
    heating, using a heating element, liquid in a zone of a liquid distribution system to a threshold temperature, the heating element being located within the liquid distribution system at a first location;
    measuring, using a temperature sensor, one or more changes in temperature of the liquid in the zone, the one or more changes bringing the temperature of the liquid in the zone to one or more temperatures that are outside the threshold temperature, the temperature sensor being located within the liquid distribution system at a second location that is upstream from the first location;

detecting a liquid flow pattern based on the measured one or more changes in the temperature, the liquid flow pattern indicating an amount of time to re-establish the zone of liquid to the threshold temperature; and in response to detecting the liquid flow pattern, performing at least one of (i) stopping a liquid flow in the liquid distribution system, or (ii) sending a notification of the detected liquid flow pattern to a user.

9. The method of claim 8, further comprising, in response to determining that the detected liquid flow pattern indicates a liquid flow anomaly, using a shut-off valve to stop the liquid flow in the liquid distribution system.

10. The method of claim 9, wherein the liquid flow anomaly comprises a leak of at least some of the liquid from the liquid distribution system.

11. The method of claim 8, wherein the liquid flow pattern is a recovery pattern exhibited by the one or more changes in the temperature.

12. The method of claim 11, wherein the recovery pattern is associated with at least one subcomponent of the liquid distribution system.

13. The method of claim 8, wherein heating liquid in a zone of a liquid distribution system to a threshold temperature comprises:

heating the liquid in the zone to the threshold temperature during a first time period; and heating the liquid in the zone to the threshold temperature during a second time period that is after the first time period.

14. The method of claim 13, wherein the amount of time to re-establish the zone of liquid to the threshold temperature is an amount of time for the liquid in the zone to reach the threshold temperature during at least one of the first time period and the second time period.

15. One or more non-transitory computer-readable media storing instructions which, when executed, instruct a computing device to perform operations for liquid flow anomaly detection, the operations comprising:

heating, using a heating element, liquid in a zone of a liquid distribution system to a threshold temperature, the heating element being located within the liquid distribution system at a first location;

measuring, using a temperature sensor, one or more changes in temperature of the liquid in the zone, the one or more changes bringing the temperature of the liquid in the zone to one or more temperatures that are outside the threshold temperature, the temperature sensor being located within the liquid distribution system at a second location that is upstream from the first location;

detecting a liquid flow pattern based on the measured one or more changes in the temperature, the liquid flow pattern indicating an amount of time to re-establish the zone of liquid to the threshold temperature; and in response to detecting the liquid flow pattern, performing at least one of (i) stopping a liquid flow in the liquid distribution system, or (ii) sending a notification of the detected liquid flow pattern to a user.

16. The one or more non-transitory computer-readable media of claim 15, the operations further comprising, in response to determining that the detected liquid flow pattern indicates a liquid flow anomaly, using a shut-off valve to stop the liquid flow in the liquid distribution system.

17. The one or more non-transitory computer-readable media of claim 16, wherein the liquid flow anomaly comprises a leak of at least some of the liquid from the liquid distribution system.

18. The one or more non-transitory computer-readable media of claim 15, wherein:

the liquid flow pattern is a recovery pattern exhibited by the one or more changes in the temperature; and the recovery pattern is associated with at least one subcomponent of the liquid distribution system.

19. The one or more non-transitory computer-readable media of claim 15, wherein heating liquid in a zone of a liquid distribution system to a threshold temperature comprises:

heating the liquid in the zone to the threshold temperature during a first time period; and heating the liquid in the zone to the threshold temperature during a second time period that is after the first time period.

20. The one or more non-transitory computer-readable media of claim 19, wherein the amount of time to re-establish the zone of liquid to the threshold temperature is an amount of time for the liquid in the zone to reach the threshold temperature during at least one of the first time period and the second time period.

* * * * *